Figure 1:
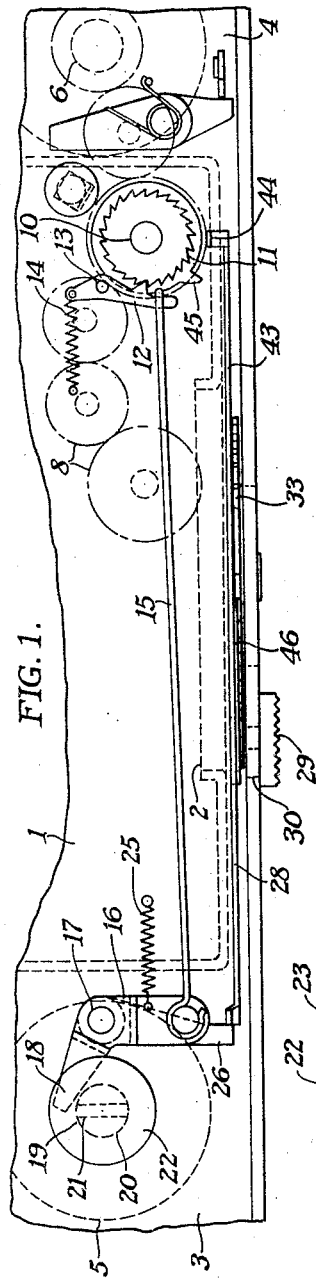

June 18, 1946.  C. W. CRUMRINE  2,402,149
CAMERA CONSTRUCTION
Filed Nov. 10, 1944

CHESTER W. CRUMRINE
INVENTOR

BY
ATTORNEYS

Patented June 18, 1946

2,402,149

UNITED STATES PATENT OFFICE 2,402,149

CAMERA CONSTRUCTION

Chester W. Crumrine, Rochester, N. Y., assignor to Eastman Kodak Company, Rochester, N. Y., a corporation of New Jersey Application November 10, 1944, Serial No. 562,761

7 Claims. (Cl. 95—31)

This invention relates to photography and more particularly to photographic camera construction. One object of my invention is to provide a camera with a film winding and rewinding mechanism which is so arranged that the operation of a control member will govern the rewinding operation. Another object of my invention is to provide a camera in which the film winding, the film rewinding and the film counting mechanisms each has operative and inoperative positions and in which a single control member may be used to govern the relative positions of these parts. Another object of my invention is to provide a film winding and rewinding mechanism which requires a minimum amount of care in its operation to obtain proper results. Other objects will appear from the following specification, the novel features being particularly pointed out in the claims at the end thereof.

In certain cameras now on the market and usually in cameras utilizing perforated film customarily sold in film retorts or containers the film is wound in one direction through the camera for making exposures and then is rewound in an opposite direction into a film retort or back onto the supply spool from which it was unwound. In such cameras it is, of course, desirable to be able to only wind the film in one direction at a time and it is, therefore, desirable to provide a means for controlling the direction of winding of the film. Moreover, in such cameras it is desirable to provide some measuring device for the film and it frequently happens that when a new film is inserted the measuring device is not properly adjusted. My invention is particularly directed to the semi-automatic control in the film winding and rewinding mechanisms and of the positioning of the counter so that an operator will find it difficult, if not impossible, to forget to properly adjust the camera mechanism when loading the camera.

Figure 2:
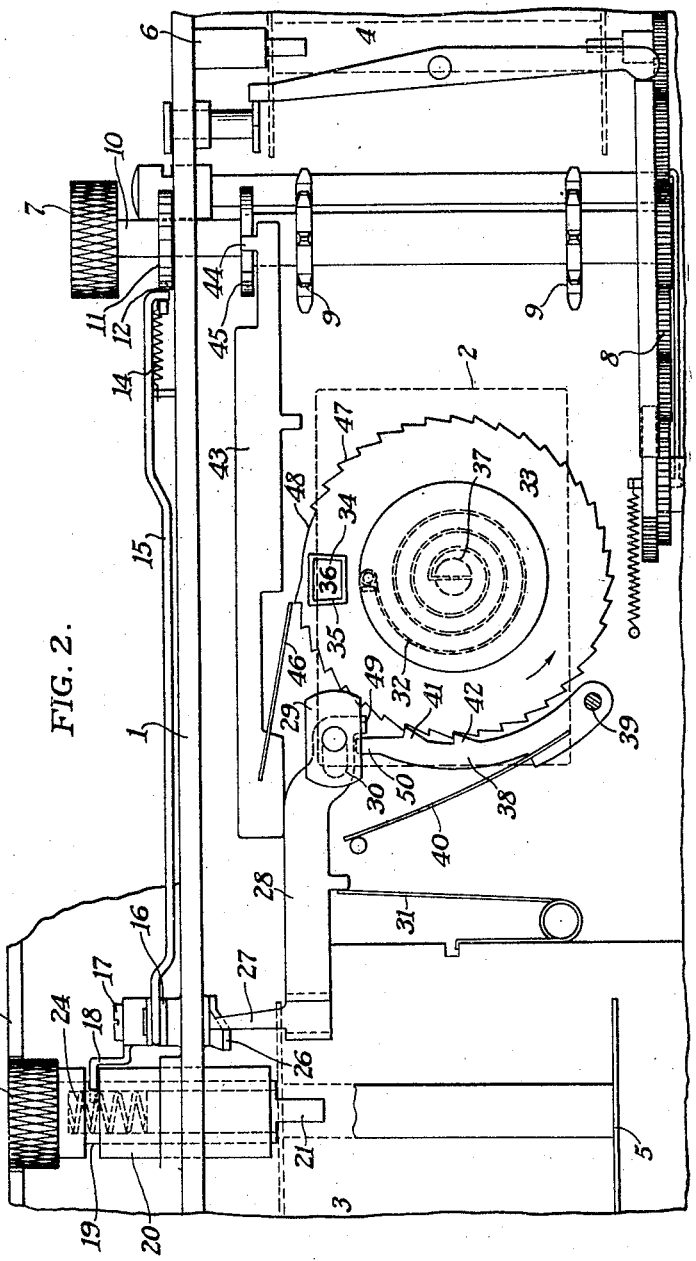

Coming now to the drawing wherein like reference characters denote like parts throughout:

Fig. 1 is a fragmentary top plan view showing a portion of a camera equipped with a film winding and rewinding mechanism and with a film counting mechanism under a unitary control member constructed in accordance with and embodying a preferred form of my invention; and Fig. 2 is a rear elevation of the mechanism used in the camera partially shown in Fig. 1.

My invention comprises broadly the provision of a unitary releasing mechanism which can be manually operated after exposures have been made on film to release a one-way clutch on the film winding mechanism to release a pawl holding the film counter and to release a latch holding a film rewinding knob in an inoperative position so that the rewinding operation can be accomplished and so that the counter dial may be automatically returned to an initial starting position.

In one form of my invention the camera body 1 may be provided with the usual exposure aperture 2, there being a supply film chamber 3 at one end and a take-up film chamber 4 at the other end. A film spool or film retort 5 may be placed in the supply chamber 3 so that the film may be led across the exposure aperture 2 and attached to a take-up film spool hub 6. In normal operation the film is wound upon the hub 6 one exposure at a time until all of the exposures have been made at which time an operator may, by operating a single manually controlled member, condition the camera for rewinding film. This rewinding will return the film to the film spool or retort 5.

The film winding mechanism in the present instance may be a film winding knob 7 as shown in Fig. 2 or I may prefer to use a gear train 8 operated by power in the manner shown in my copending application for "Camera film wind and shutter control mechanism," Serial No. 562,760, filed November 10, 1944. In any event, the film sprocket wheels 9 may be turned by operating a shaft 10, this shaft carrying a ratchet wheel 11 which may, through its engagement with a pawl 12, permit movement of the sprockets 9 only in one direction. The pawl 12 is pivoted at 13 and a spring 14 normally engages the pawl with the ratchet.

A rod 15 connected to the pawl is attached to one arm 16 of a bell crank lever pivoted at 17 and having a second arm 18 normally engaging a notch 19 in a film rewind spindle 20. This spindle is provided with a web 21 for turning a film spool, such as the spool 5, and it is provided with a winding knob 22 which in its inoperative position shown in Fig. 2 lies flush with a camera casing wall 23. A spring 24 inside the rewinding spindle will project the knob 22 into an operative position extending outside of the wall 23 when the latch formed by the bell crank lever 16 is released. A spring 25 normally holds the rewinding key latch in its operative position. However, there is an extension 26 carried by the bell crank lever which may be engaged by an arm 27 carried by a slide 28 mounted on the camera.

The slide is provided with a handle 29 which extends through a slot indicated in broken lines at 30 in the camera back so that this slide may be manually moved. A spring 31 tends to move the slide in the direction shown by the arrow in Fig. 1. In order to measure the amount and indicate the number of exposures made, I provide a film counter mechanism which may consist of a dial 33 bearing a scale 34 which may be viewed through a suitable window 35. A spring 32 attached to the dial and to a fixed shaft 37 tends to move the counter dial in the direction shown by the arrow. However, this movement is opposed by means of a pawl 38 pivoted at 39 to the camera and pressed by a spring 40 toward the ratchet wheel. The pawl is provided with two teeth 41 and 42 and either one or the other of these teeth will engage the ratchet wheel 33 and hold it against counterclockwise movement except when the pawl 38 is moved away from the ratchet.

In order to move the ratchet one step for each exposure, I provide a slide 43 having a lug 44 which may be engaged by the single-toothed gear 45, this gear making one revolution at each exposure. Thus the tooth 45 will engage the lug 44 and move the slide to the right in Fig. 2, thus causing a spring arm 46 to move into engagement with a ratchet tooth 47 and move the ratchet wheel 33 one step. However, when all of the film has been wound, as indicated in Fig. 2 by the numeral 36 appearing in the window 35, a mutilated portion 48 in the ratchet wheel will be brought opposite the spring pawl 46. Consequently, if an attempt is made to further wind the film this will not affect the ratchet wheel 33. Since two teeth are removed at the mutilated portion 48, it is necessary to provide the two teeth 41 and 42 on the pawl 38 so that the pawl will always hold the ratchet in any set position.

Assuming now that all the film has been wound and the parts are in the position shown in Fig. 2, the operator realizes that no more exposures are to be made so he then presses the handle 29 to the left with respect to Fig. 2. This movement accomplishes the following results. First, a lug 49 engages the end 50 of the pawl 38 moving it away from the ratchet wheel 33. The spring 32 then turns the ratchet wheel in a counterclockwise direction until it reaches an initial or a starting position. I prefer to provide this position three teeth below the first numeral since it is necessary to wind three areas of film before making the first exposure to wind off the exposed end of the film.

Second, the movement of the handle 29 moves lever 26 and with it bell crank lever 16 in a clockwise direction about the pivot 17 removing the latch arm 18 from the latching notch 19 in the rewind knob shaft. This permits spring 24 to project the rewinding knob 22 upwardly and outside of the wall 23 so that it is accessible for rewinding film.

Third, the operation of the handle 29 through the bell crank lever 16 and rod 15 will swing the pawl 12 of the one-way clutch 11—12 out of engagement with the ratchet wheel so that the sprocket 9 may turn in a direction reverse to that used in winding the film on the spool hub 6.

Thus, by moving the single handle 29, these three functions occur substantially simultaneously so that the operator next merely turns the rewind knob 22 until the film is completely rewound in the retort or on the spool 5 as the case may be.

The operator will then insert a fresh film spool in the supply chamber 3 threaded across the exposure aperture 2, and attach it to the hub 6 in the take-up chamber 4. Since the rewind knob 22 is still projecting from the casing 23, this knob may be depressed. When this is done the latch element 18 will snap into the latching notch 19 because of the spring 25 acting on the bell crank lever 16, the spring 14 acting on the pawl 12, the spring 40 acting on the pawl 38, and the spring 31 acting on the slide 28. All of these springs acting on their various parts tend to return the manually adjustable knob 29 to its initial position as soon as the operator releases this knob. Thus the pawl holding the counter, the pawl of the one-way clutch and the latch member are always spring pressed into their operative positions from which they may be moved by the manual operation of the handle 29. This greatly reduces the chance of erroneous operation of the camera and renders the camera substantially foolproof as to the winding and rewinding operations. In addition, the operator does not need to remember to set the counter dial each time the film is loaded because this dial will automatically return to an initial starting position each time the film is rewound.

What I claim is:

1. In a roll holding camera of the type including an exposure aperture, spool chambers at each side thereof, and mechanism for winding film from one spool chamber constituting a supply chamber to the other spool chamber constituting a take-up spool chamber, the combination with said mechanism, of a film counter comprising a ratchet wheel, a spring tending to turn the ratchet wheel in one direction, means for moving the ratchet wheel at each actuation of the mechanism for winding film against spring pressure, a pawl for holding the ratchet wheel against spring pressure, a rewinding knob movable to and from an inoperative position, and means controlling the position of the rewinding knob including a movable member, a handle for moving the movable member for releasing both the rewinding knob and the pawl.

2. In a roll holding camera of the type including an exposure aperture, spool chambers at each side thereof, and mechanism for winding film from one spool chamber constituting a supply chamber to the other spool chamber constituting a take-up spool chamber, the combination with said mechanism, of a film counter comprising a ratchet wheel, a spring tending to turn the ratchet wheel in one direction, means for moving the ratchet wheel at each actuation of the mechanism for winding film against spring pressure, a pawl for holding the ratchet wheel against spring pressure, a rewinding knob movable to and from an inoperative position, a spring tending to move said knob to an operative position, a latch for restraining such movement, a manually movable member for moving said latch and moving the pawl from the ratchet whereby the rewinding knob spring and the ratchet spring may move their respective members.

3. In a roll holding camera of the type including an exposure aperture, spool chambers at each side thereof, and mechanism for winding film from one spool chamber constituting a supply chamber to the other spool chamber constituting a take-up spool chamber, the combination with said mechanism, of a film counter comprising a ratchet wheel, a spring tending to turn the ratchet wheel in one direction, means for moving the ratchet wheel at each actuation of the mechanism for winding film against spring pressure, a pawl for holding the ratchet wheel against spring pressure, a rewinding knob movable to and from an inoperative position, a spring tending to move said knob to an operative position, a latch for restraining such movement, a manually movable member for moving said latch and moving the pawl from the ratchet, a one-way clutch for preventing the mechanism for winding film from turning in a rewinding direction, and connections between said one-way clutch and the rewinding knob controlling means for releasing the one-way clutch permitting film to be wound in a rewinding direction.

4. In a roll holding camera including an exposure aperture, spool chambers to each side thereof forming supply and take-up chambers, and means for winding film from the supply chamber and into the take-up chamber, the combination with said means, of a releasable one-way clutch forming a part of said means movable to and from an operative, or film-winding, position and to and from an inoperative position in which film cannot be wound, a movably-mounted knob for rewinding film from the take-up chamber to the supply chamber, said knob having an operative film rewinding position and an inoperative position in which film cannot be rewound, a movable film counter mechanism having an operative position for counting film exposures as the film is wound, and having an inoperative position of rest from which position it may be moved to count exposures made on a fresh film, a single movably-mounted and manually-operable member interconnecting the releasable one-way clutch, the movable film rewinding knob and the movable film counter mechanism for coordinating the movements thereof.

5. A combination as called for in claim 4 in which the single manually-operable member includes a latch for the rewinding knob, a pawl for the counter mechanism and a pawl for the clutch, all operably connected for substantially simultaneous operation.

6. A combination as called for in claim 4 in which the single manually-operable member includes a latch for the rewinding knob, a pawl for the counter and a pawl for the clutch operably connected together, and springs tending to move said latch and pawls into an operative position with respect to said rewinding knob, said counter and said one-way clutch.

7. A combination as called for in claim 4 in which the one-way clutch, the counter and the rewinding knob are all spring pressed into their operative positions from which they may be moved by said single manually-operable member.

CHESTER W. CRUMRINE.